(12) United States Patent
Carabin

(10) Patent No.: US 10,620,460 B2
(45) Date of Patent: Apr. 14, 2020

(54) HANDS-FREE SPECTRALLY-TUNABLE SMART LOUPE

(71) Applicant: Rancho El Toston, LLC, San Antonio, TX (US)

(72) Inventor: Christopher R. Carabin, San Antonio, TX (US)

(73) Assignee: Rancho El Toston, LLC, San Antonio, TX (US)

( * ) Notice: Subject to any disclaimer, the term of this patent is extended or adjusted under 35 U.S.C. 154(b) by 214 days.

(21) Appl. No.: 15/889,968

(22) Filed: Feb. 6, 2018

(65) Prior Publication Data

US 2018/0224674 A1 Aug. 9, 2018

Related U.S. Application Data

(60) Provisional application No. 62/456,042, filed on Feb. 7, 2017.

(51) Int. Cl.
| | |
|---|---|
| G02C 1/00 | (2006.01) |
| G02C 11/00 | (2006.01) |
| G02C 7/08 | (2006.01) |
| F21V 33/00 | (2006.01) |
| F21V 23/04 | (2006.01) |
| A61C 1/08 | (2006.01) |
| A61C 5/00 | (2017.01) |
| G02C 9/04 | (2006.01) |
| F21Y 113/13 | (2016.01) |
| F21Y 115/10 | (2016.01) |

(52) U.S. Cl.
CPC ............. *G02C 11/10* (2013.01); *A61C 1/088* (2013.01); *A61C 5/00* (2013.01); *F21V 23/0442* (2013.01); *F21V 23/0471* (2013.01); *F21V 33/0004* (2013.01); *G02C 7/086* (2013.01); *F21Y 2113/13* (2016.08); *F21Y 2115/10* (2016.08); *G02C 9/04* (2013.01)

(58) Field of Classification Search
CPC .............................. G06T 19/006; G02C 11/10
USPC ............................. 351/158, 47, 57; 361/105
See application file for complete search history.

(56) References Cited

U.S. PATENT DOCUMENTS

2016/0076747 A1* 3/2016 Lively .................. A61B 90/361
362/105

OTHER PUBLICATIONS

"Bridgelux® Vesta™ Series Tunable White 9mm Array", https://www.bridgelux.com/products/vesta-series, 2017, pp. 1-16.
"High Luminous Efficacy RGBW LED Emitter, LZC-03MD07", LED ENGIN, 2017, pp. 1-16.
"LuxiGen Multi-Color Emitter Series LZP RGBW Flat Lens LED Emitter, LZP04MD00", LED ENGIN, 2017, pp. 1-19.

* cited by examiner

*Primary Examiner* — Hung X Dang
(74) *Attorney, Agent, or Firm* — Kunzler Bean & Adamson

(57) ABSTRACT

An apparatus for illuminating an area is disclosed. The apparatus includes a frame and a spectrally-tunable lighting module comprising one or more light-emitting diodes. The apparatus further includes a control module with a hands-free interface that controls a light output of the spectrally-tunable lighting module in response to one or more lighting commands and a power module within the frame that powers the control module and the spectrally-tunable lighting module. A system and a method for using the apparatus are also disclosed.

20 Claims, 10 Drawing Sheets

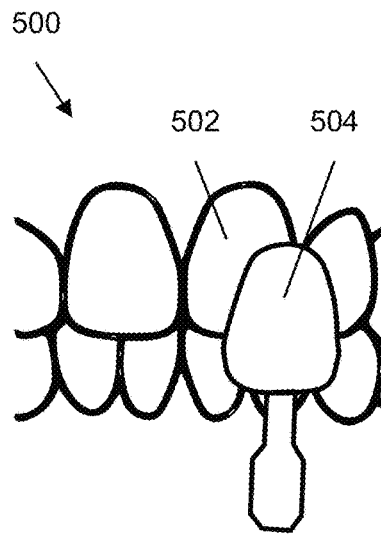

FIG. 5A

| | | |
|---|---|---|
| 506 → | user name | Dr. Scrivello |
| 508 | application | dental |
| | profile type | color matching |
| | CRI | 90+ |
| | color temp | 5000-6500 K |
| 510 | LED mod. type 1 | RGBW |
| | R | high |
| | G | high |
| | B | high |
| | W | high |
| | LED mod. type 2 | CW |
| | C | high |
| | W | low |
| | driver mod. type | const. curr. |

FIG. 5B

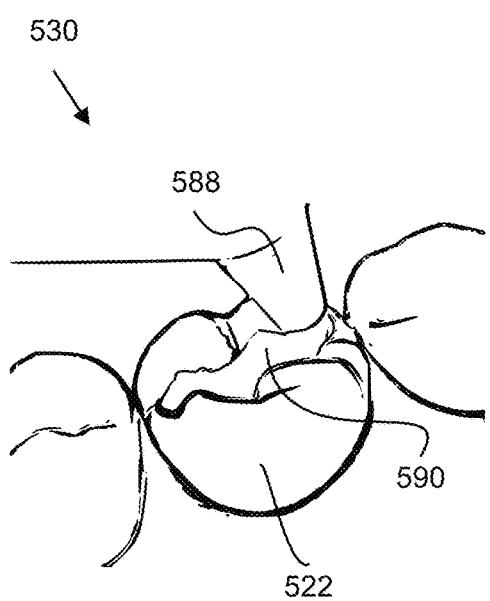

FIG. 5C

| | | |
|---|---|---|
| 506 → | user name | Dr. Scrivello |
| 524 | application | dental |
| | profile type | anti-curing |
| | CRI | n/a |
| | color temp | 1500-3500 K |
| 526 | LED mod. type 1 | RGBW |
| | R | high |
| | G | high |
| | B | low |
| | W | high |
| | LED mod. type 2 | CW |
| | C | low |
| | W | high |
| | driver mod. type | const. curr. |

FIG. 5D

HANDS-FREE SPECTRALLY-TUNABLE SMART LOUPE

CROSS-REFERENCES TO RELATED APPLICATIONS

This application claims the benefit of U.S. Provisional Patent Application No. 62/456,042 entitled "DYNAMIC SPECTRAL TUNING OF A TUNABLE WHITE LIGHT ILLUMINATION SOURCE FOR DENTAL, SURGICAL, AND MEDICAL LOUPES" filed on Feb. 7, 2017, for Christopher R. Carabin, which is incorporated herein by reference.

FIELD

This invention relates to loupes and more particularly relates to loupes that provide lighting suitable for performing different procedures such as dental and medical procedures.

BACKGROUND

Procedures in the fields of medicine and dentistry are challenging because they often require precision and efficiency which requires that the care providers are able to clearly see the area of the patient involved in the procedure so that they can perform the procedure with accuracy and manual dexterity. To see precisely and clearly, in turn, requires suitable lighting. For example, a dentist must try to precisely and efficiently examine and interact with a patient's teeth. Because the patient's teeth are inside his or her mouth, the ability of a dentist to get and maintain a clear view of the area he or she is working on can be affected by a number of conditions such as for example, the dentists vision, the distance from the dentist to the patient, and the lighting conditions.

Dental chairs are designed to allow a patient to be positioned in a reclining position. A dentist may use a dental light mounted on an articulated arm to allow the dentist to direct a bright light to illuminate an area inside the patient's mouth without the light also shining in the patient's eyes. Dentists and other care providers such as surgeons, doctors, and other professionals may also use loupes. Loupes are magnifying devices that a care provider may wear to improve his or her ability to accurately view the area involved with the procedure being performed such as for example, an area of a patient's teeth. Some loupes are fitted with a light so that the relevant area of the patient's mouth is illuminated and magnified suitably throughout any dental procedure.

SUMMARY

A hands-free spectrally-tunable loupe is disclosed. A system and method for using the hands-free spectrally-tunable loupe are disclosed.

In at least one embodiment, the hands-free spectrally-tunable loupe includes a frame and a spectrally-tunable lighting module comprising one or more light-emitting diodes. In the embodiment, the hands-free spectrally-tunable loupe further includes a control module with a hands-free interface that controls a light output of the spectrally-tunable lighting module in response to one or more lighting commands and a power module within the frame that powers the control module and the spectrally-tunable lighting module.

A system is disclosed that includes a head-mounted device for illuminating an area based on one or more predetermined lighting commands. In at least one embodiment, the system further includes a hands-free interface that communicates the one or more predetermined lighting commands for one or more procedures to be performed to the head-mounted device and a lighting module that adjusts one or more spectral characteristics of light emitted by the head-mounted device in response to receiving the one or more predetermined lighting commands.

A method is disclosed that includes, in at least one embodiment, receiving one or more lighting commands at a loupe via a hands-free interface for adjusting one or more color characteristics of light emitted from a spectrally-tunable lighting module for the loupe. In the embodiment, the method further includes communicating the one or more lighting commands for the one or more procedures to the spectrally-tunable lighting module of the loupe and illuminating an area for performing the one or more procedures in response to the one or more lighting commands communicated to the spectrally-tunable lighting module of the loupe.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not, therefore, to be considered to be limiting of its scope, the invention will be described and explained with additional specificity and detail through the use of the accompanying drawings, in which:

FIG. 5A is a schematic block diagram illustrating an example first application for the embodiment of FIG. 2A that includes color matching as part of a procedure;

FIG. 5B is a table illustrating a first lighting profile for the first application illustrated in FIG. 5A;

FIG. 5C is a schematic block diagram illustrating a second application for the embodiment of FIG. 2A that includes color matching as part of a procedure;

FIG. 5D is a table illustrating one embodiment of a second lighting profile for the second application illustrated in FIG. 5C;

DETAILED DESCRIPTION

Figure 1:
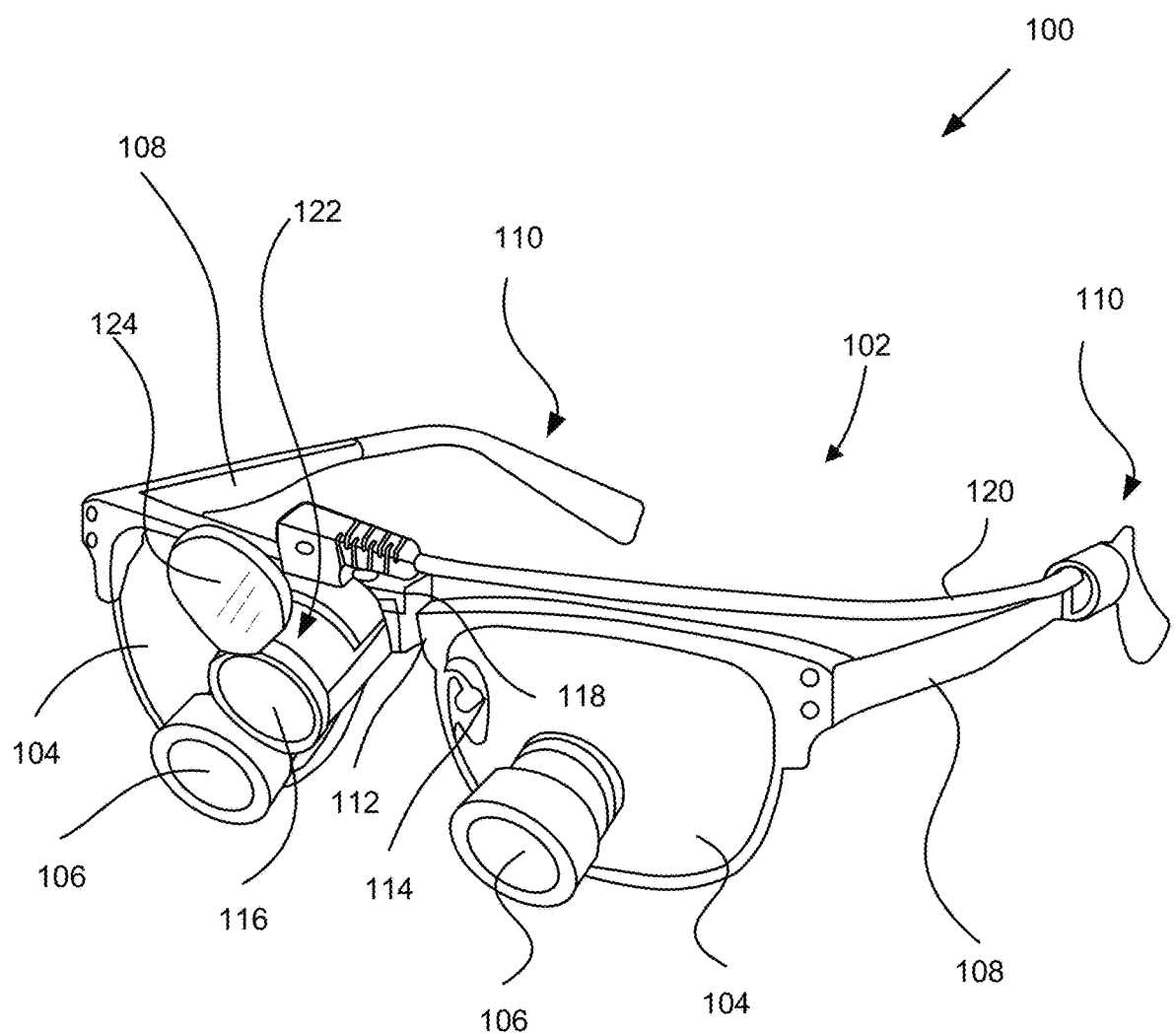
FIG. 1 is a perspective view illustrating an example of an existing loupe.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer readable medium may be a tangible computer readable storage medium storing the program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store program code for use by and/or in connection with an instruction execution system, apparatus, or device.

The computer readable medium may also be a computer readable signal medium. A computer readable signal medium may include a propagated data signal with program code embodied therein, for example, in baseband or as part of a carrier wave. Such a propagated signal may take any of a variety of forms, including, but not limited to, electrical, electromagnetic, magnetic, optical, or any suitable combination thereof. A computer readable signal medium may be any computer readable medium that is not a computer readable storage medium and that can communicate, propagate, or transport program code for use by or in connection with an instruction execution system, apparatus, or device. Program code embodied on a computer readable signal medium may be transmitted using any suitable medium, including but not limited to wire-line, optical fiber, Radio Frequency (RF), or the like, or any suitable combination of the foregoing In one embodiment, the computer readable medium may comprise a combination of one or more computer readable storage mediums and one or more computer readable signal mediums. For example, program code may be both propagated as an electromagnetic signal through a fiber optic cable for execution by a processor and stored on RAM storage device for execution by the processor.

Program code for carrying out operations for aspects of the present invention may be written in any combination of one or more programming languages, including an object-oriented programming language such as Java, Smalltalk, C++, PHP or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). The computer program product may be shared, simultaneously serving multiple customers in a flexible, automated fashion.

The computer program product may be integrated into a client, server, and network environment by providing for the computer program product to coexist with applications, operating systems and network operating systems software and then installing the computer program product on the clients and servers in the environment where the computer program product will function. In one embodiment software is identified on the clients and servers including the network operating system where the computer program product will be deployed that are required by the computer program product or that work in conjunction with the computer program product. This includes the network operating system that is software that enhances a basic operating system by adding networking features.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by program code.

The program code may be provided to a processor of a general-purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The program code may also be loaded onto a computer, other programmable data processing apparatus, or other devices to cause a series of operational steps to be performed on the computer, other programmable apparatus or other devices to produce a computer implemented process such that the program code which executed on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer-readable medium having program code embodied thereon.

The schematic flowchart diagrams and/or schematic block diagrams in the Figures illustrate the architecture, functionality, and operation of possible implementations. It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Although various arrow types and line types may be employed in the flowchart and/or block diagrams, they are understood not to limit the scope of the corresponding embodiments. Indeed, some arrows or other connectors may be used to indicate only an exemplary logical flow of the depicted embodiment.

The description of elements in each figure may refer to elements of proceeding figures. Unless otherwise clear from context, like numbers refer to like elements in all figures, including alternate embodiments of like elements.

FIG. 1 is a perspective view illustrating an example of an existing loupe 100 that incorporates many of the elements found in existing loupes. Dental, medical, and surgical loupes, such as existing loupe 100, can provide significant benefits by allowing procedures to be performed under helpful magnification. However, existing loupes may suffer from problems including lighting, mechanical, ergonomic, hygienic, and procedural problems that interrelate and affect the quality of dentistry, surgery, and/or medicine that is being performed. This section describes various elements found in existing loupe 100 that affect those interrelated problems, and subsequent sections describe how the various embodiments of the hands-free spectrally-tunable smart loupe described below recognize and solve these interrelated problems. Many of the examples used illustrate the problems with existing loupes relate to dentistry. However, similar problems may be found in existing loupes used in the fields of surgery and medicine.

The existing loupe 100 includes a frame 102 that holds lenses 104. As used herein, the term "frame" refers to the entire frame including the temples 108 on both the left and right sides. A rear portion 110 of the temple 108 of the frame 102 is sometimes called a temple tip in existing loupes. The existing loupe 100 may also include magnifiers 106 (sometimes referred to as telescopes) that attach to lenses 104. As used herein, unless otherwise clear from context, the terms "loupe," "dental loupe," "surgical loupe," "medical loupe," and so forth, generally refer to the entire piece of eyewear including the frame 102, lenses 104, magnifiers 106, rather than referring separately to the individual telescopes or magnifiers 106. For example, the magnifiers 106 may help the dentist or dental hygienist inspect the inside of the patient's mouth and focus his or her vision closely on particular areas, such as for example, when performing an evaluation or reparative procedure on the patient's teeth.

The existing loupe 100 may be worn substantially the same way that eyeglasses may be worn, with temples 108 that rest on the dentist's ears and a rear portion 110 of the temples curving behind the dentist's ears. The frame 102 of the existing loupe 100 has a bridge 112 and/or nose pads 114 that rest upon the dentist's nose substantially as eyeglasses do.

The existing loupe 100 may also include a light 116 that attaches to a frame 102 using a mount 118. The existing loupe 100 may also include a cable 120 that may connect to a power source such as a battery pack (not shown) which the dentist puts in a pocket so that the light 116 has sufficient power to illuminate an area in the patient's mouth during a procedure to be performed by the dentist.

Some dental loupes such as the existing loupe 100 depicted in FIG. 1 may include a small rechargeable battery (not shown) inside a housing 122 for the light 116. In such configurations, the cable 120 may be used to recharge the battery. However, some procedures are time-consuming so having sufficient battery life to maintain suitable illumination throughout the procedure can be challenging.

Moreover, some procedures include multiple steps that have different lighting requirements. For example, some composite resins used in dental work are cured or hardened by application of light in the blue range of visible light or by other short wavelength light. Typically, this curing is performed by handheld application of a high-intensity curing light.

Although many dentists and other care providers use loupes similar to existing loupe 100, a number of interrelated problems with loupes such as existing loupe 100 have been recognized by the present inventor, which problems are addressed by the various embodiments of a hands-free spectrally-tunable smart loupe which is described in more detail below.

It may be useful to explain in more detail the meaning of particular terms as they are used in this application.

As used herein the term "hands-free" means configured to be useful to perform a procedure without substantial functional contact between the loupe wearer's hands and the loupe during the performance of the procedure. For example, a loupe that is capable of interacting with the wearer by means of voice or other sounds may be considered a hands-free loupe. Similarly, a loupe may interact based on hand or finger gestures and still be considered a hands-free loupe, provided that such hands or finger gestures do not require substantial functional contact between the loupe wearer's hands and the loupe during the performance of the procedure. By contrast, if for example, during a performance of a procedure, the wearer needed to manually turn a dial in order to change the intensity of the lighting or to flip a filter to change the color of the lighting, a loupe that utilized such manipulations during the performance of the procedure would not be considered hands-free. A "procedure" as used herein may include a multistep procedure or may include multiple procedures.

While many of the procedures described herein refer to dental procedures, medical procedures, surgical procedures, and the like, other procedures may be performed using a hands-free spectrally-tunable smart loupe. For example, art restoration procedures, jewelry procedures, counterfeit detection procedures, and so forth may all benefit from the use of a hands-free spectrally-tunable smart loupe in particular because they all involve the use of both hands during the procedure and the need to adjust lighting conditions during the procedure according to one or more lighting profiles.

However, a "hands-free" loupe could accommodate manual adjustments or interactions that utilize substantial functional contact between the loupe wearer's hands and the loupe prior to or after the performance of the procedure. For example, a user of the loupe might use his or her hands to place the hands-free loupe upon his or her head prior to performing a procedure. Similarly, hands-free loupe might utilize substantial functional contact if it is being sterilized before or after a procedure or if it is being configured or calibrated before or after a procedure.

The term "spectrally-tunable" with reference to lighting, means configurable to accommodate changes in spectral characteristics. For example, a lighting module for a loupe that is configurable to accommodate changes in the emission spectrum or intensity of light having different wavelengths would be considered spectrally-tunable. Similarly, a lighting module for a loupe that is configurable to emit various combinations of light having different wavelengths would also be considered spectrally-tunable. By contrast, a lighting module that is only capable of emitting light having a single wavelength would not be considered spectrally-tunable merely because it is configurable to accommodate a change from an "off" state to an "on" state.

The term "smart loupe" means a loupe that is configurable to communicate, process, respond and otherwise interact with the wearer using a processor, logic circuitry, or similar electronic functions. For example, a loupe that includes a microcontroller and electrical circuitry that facilitate communications by gesture or voice, communication, and processing of data, and/or determining and responding to internal or external conditions would be considered a "smart loupe." By contrast, a loupe with lighting that provides responses to ordinary mechanical and electrical controls such as turning on when a switch is moved, or a button is pressed would not be considered a "smart loupe" on the basis of it responding to for example a gesture that contacts and presses an on/off button.

However, this does not mean that a smart loupe is devoid of novel mechanical features particularly when such mechanical features enhance the interactive "smart loupe" features. So, for example, a loupe with mechanical features configurable to promote comfortable wearing may enhance the smart and/or hands-free capabilities of the loupe by extending the duration in which the loupe may be comfortably worn while responding as a "smart loupe" to various "hands-free" communications with a care provider.

Figure 2A:
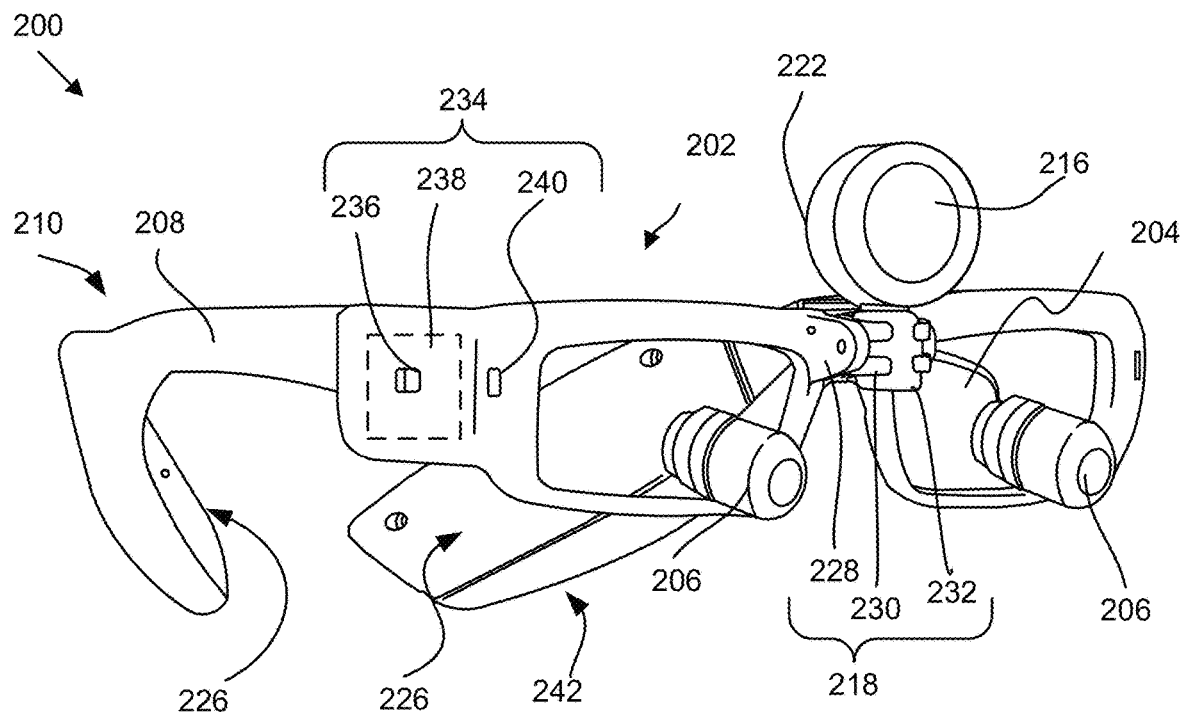
FIG. 2A is a right-front perspective view illustrating one embodiment of a hands-free spectrally-tunable smart loupe in accordance with one embodiment of the present invention.
Figure 2B:
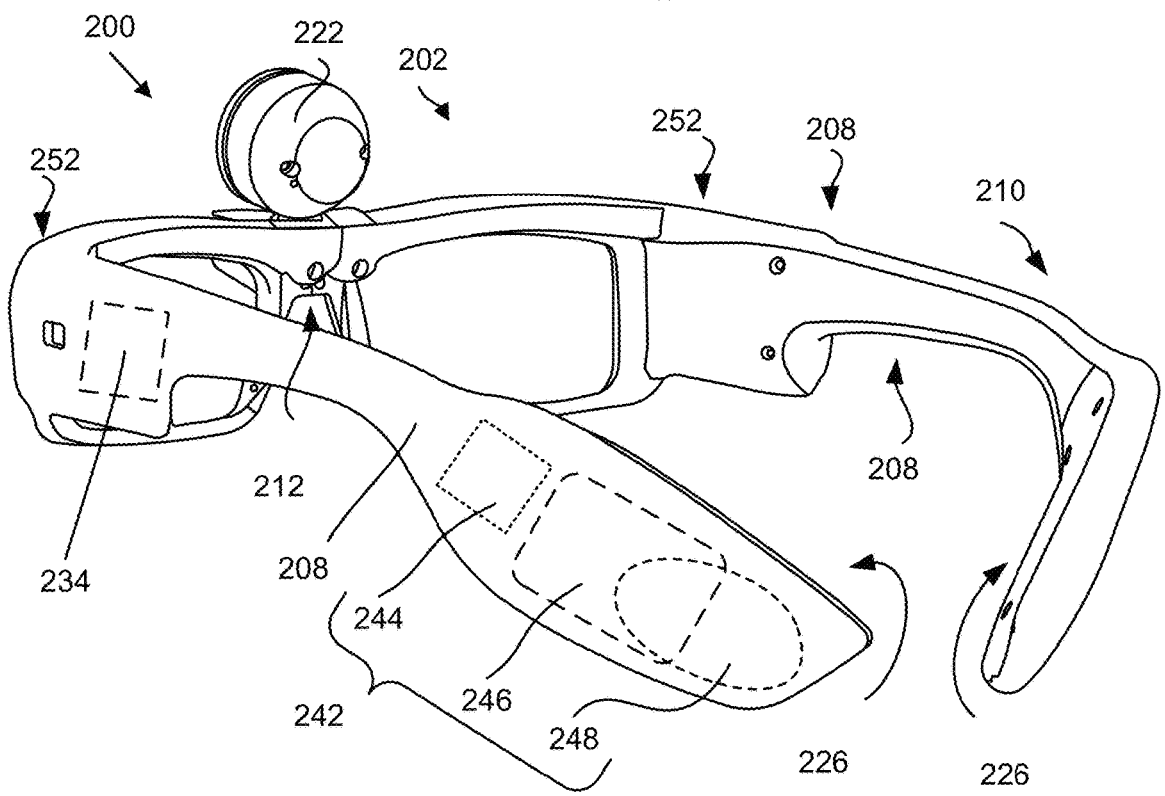
FIG. 2B is a left-rear perspective view of the embodiment of FIG. 2A.

Referring now to FIGS. 2A, 2B, FIG. 2A is a right-front perspective view illustrating one embodiment of a hands-free spectrally-tunable smart loupe 200 for illuminating an area in accordance with one or more embodiments of the present invention. FIG. 2B is a left-rear perspective view of the embodiment of FIG. 2A.

At least one embodiment, the hands-free spectrally-tunable smart loupe 200 includes a frame 202 that may have a similar form to that of a frame for eyeglasses where the frame includes a front portion 252 and temples 208 that include a rear portion 210. In some embodiments, the portions of the frame 202 including portions of the temples 208 may include interior compartments or channels that are configurable to enclose various components and connections of the hands-free spectrally-tunable smart loupe 200.

In some embodiments, the frame may be formed of materials that exhibit a certain amount of elasticity so that the temples 208 of the frame 202 gently but resiliently press against the wearer (e.g., dentist or hygienist, etc.) during use. As used herein, the term "frame" as in frame 202 refers to the entire frame and not merely to that portion of the frame in front that holds the lenses 204. In other words, the frame 202 includes the temples 208 on both the left and the rear sides including both the front portion 252 and the rear portion 210 of each temple 208.

In some embodiments, materials for the frame 202 may be made of plastics such as cellulose acetate, cellulose acetate propionate, or blended nylon such as polyamides, co-polyamides, and the like. In other embodiments, the frames may be made of metal such as titanium, beryllium, stainless steel, aluminum, and the like. Moreover, the frame 202 may be laminated and may include a combination of various materials. In some embodiment, the combination of various materials may be used. For example, in some embodiments, metal components may be used on an interior portion of the frames 202 to provide a degree of RF shielding while plastic components may be used on the exterior portion of the frames 202 to allow RF signals to easily be emitted away from the wearer.

In some embodiments, the frame 202 a rear portion 210 of the frame 202 (e.g., a rear portion of the temples 208 on both the left and right sides) may have a planiform portion 226 that has a significant surface area and is configured to resiliently press against a back portion of a wearer's head during use. It may be noted that the surface area of the planiform portion 226 may be significantly larger than the surface area of the rear portion 110 of the existing loupe 100 as shown in FIG. 1.

In some loupes, such as existing loupe 100, a substantial portion of the total weight of the frame 102 may be supported by the bridge 112 for the nose pads 114. This may be the source of several problems such as soreness or irritation due to most of the weight pressing against the wearer's nose.

Moreover, the uneven distribution of weight may cause the existing loupe 100 to slip or shift position. This can be a problem because it may require the dentist to re-adjust the loupe thus interrupting a dental procedure and requiring the dentist to touch the frame 102 which may contaminate the dentist's fingers or thumb. It may also reduce the duration of time that a dentist may comfortably wear the existing loupe 100.

Thus, in embodiments in which the large surface area of the planiform portion 226 of the frame 202 is configured to press resiliently against a back portion of a wearer's head during use, the hands-free spectrally-tunable smart loupe 200 helps solve the weight distribution problem of the existing loupe 100 and thus significantly improves the hands-free operational nature of the hands-free spectrally-tunable smart loupe 200 during procedures.

Moreover, in some embodiments, the hands-free spectrally-tunable smart loupe 200 includes a power module 242 that comprises a battery 246 within a rear portion 210 of the frame 202. In some embodiments, a battery 246 may be included in each rear portion 210 on the left and right sides of the frame. In some embodiments, the battery may be a rechargeable battery such as a lithium ion or lithium polymer ion battery/In some embodiments, the power module 242 includes a charging circuit 248 that receives power wirelessly for recharging the battery 246.

For example, the charging circuit 248 may include one or more inductive or resonant coils that provide current when placed in a charging field 426 emitted by one or more inductive or resonant coils in a wireless charger 424. The charging circuit 248 may also include active components and printed circuit board components. One source for a wireless charging module that includes a charging coil, printed circuit board, and active components is Integrated Device Technology, Inc of San Jose, Calif. USA who distributes their products in the US through distributors such as for example Mouser Electronics.

One of the benefits of a hands-free loupe such as hands-free spectrally-tunable smart loupe 200 is that the hands-free nature of the loupe minimizes the risk of contamination of the loupe surface by hand-borne pathogens. A related benefit of the power module 242 including the battery 246 which is a rechargeable battery and a charging circuit 248 that is wireless is that without a need for a battery door to exchange a used battery, the frame 202 to be designed to minimize or even eliminate openings, cracks, crevices, etc., which may also harbor pathogens. Thus, in some embodiments, the hands-free spectrally-tunable loupe may be less likely to be contaminated and may be easier to decontaminate because the batteries may be charged without openings are connections typically associated with non-rechargeable or recharging via and wires.

It may be noted that although battery 246 adds weight to the frame 202, the frame 202 includes the planiform portion 226 that presses against the back portion of the wearer's head during use and supports the weight directly on a greater surface area of the wearer's head. Thus, a significant portion of the weight of the battery 246 (or batteries) is substantially distributed over a broad area of the planiform portion 226 rather than being concentrated at a particular point of the frame such as the bridge 212 or a portion of the temples 208 that rests upon a wearer's ears.

In at least one embodiment, the frame 202 further includes a spectrally-tunable lighting module 216 that includes one or more light emitting diodes. More details about components and characteristics of various embodiments of the spectrally-tunable lighting module 216 are described below with respect to FIGS. 5B, 5D, 6A-6D, 7A-7D, 8A-8C. In some embodiments, the spectrally-tunable lighting module 216 is configured to be spectrally-tunable by adjusting various electrical parameters applied to that one or more LEDs included in the spectrally-tunable lighting module 216.

In some embodiments, one or more of the control module 234, the power module 242, and the spectrally-tunable lighting module 216 may be a distributed module. For example, the spectrally-tunable lighting module 216 may include an LED module enclosed within a housing 222 and may further include an LED driver (not shown in FIGS. 2A-2B) enclosed within a different area of the frame 202 such as for example a front portion of the temple 208.

It may be noted that in some embodiments, various modules or other components of the hands-free spectrally-tunable smart loupe 200, may be further distributed in the various compartments at the front portion 252 or rear portion 210 of the temples 208 on both the left side and right side of the frame 202 and/or in the housing 222. Various components distributed within the frame 202 may be electrically connected by wires or other connectors that also are enclosed within the frame 202.

In at least one embodiment, the hands-free spectrally-tunable smart loupe 200 further comprises an adjustable mount 218 that couples the spectrally-tunable lighting module 216 to an upper front portion of the frame 202. The adjustable mount 218 may be configured to couple the housing 222 for the spectrally-tunable lighting module 216 to a portion of the frame 202 so that the direction of the light that is emitted from the spectrally-tunable lighting module 216 may be precisely adjusted to align with the focus point of any magnifiers 206 that are attached to the lenses 204.

Figure 3A:
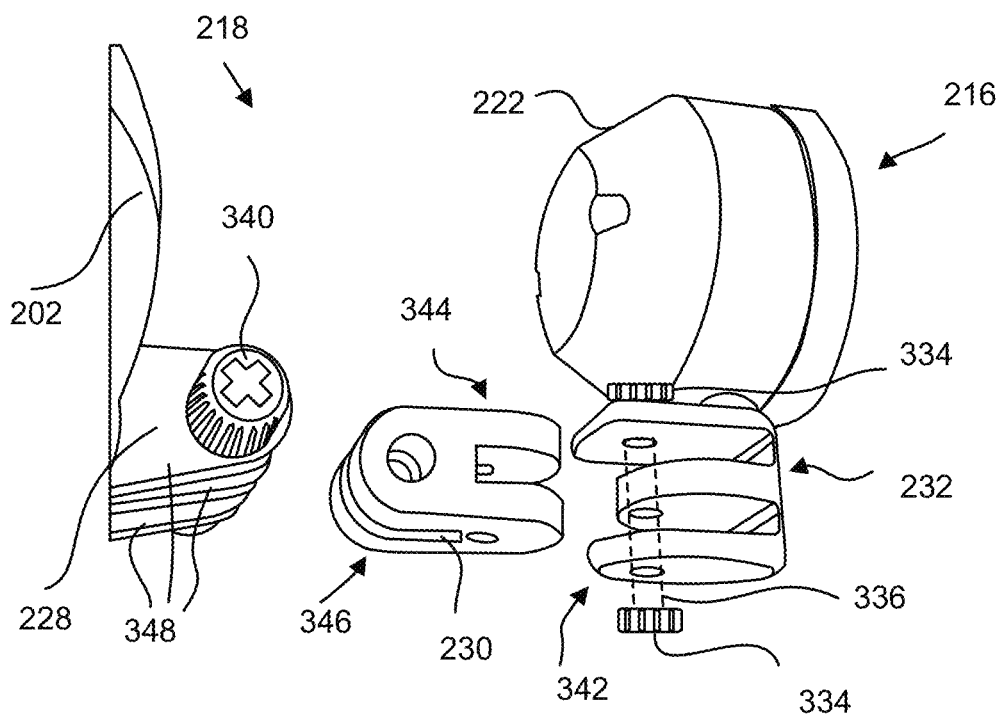
FIG. 3A is an exploded right-perspective view illustrating details of an embodiment of an adjustable mount for a lighting module of the embodiment of FIG. 2A.
Figure 3B:
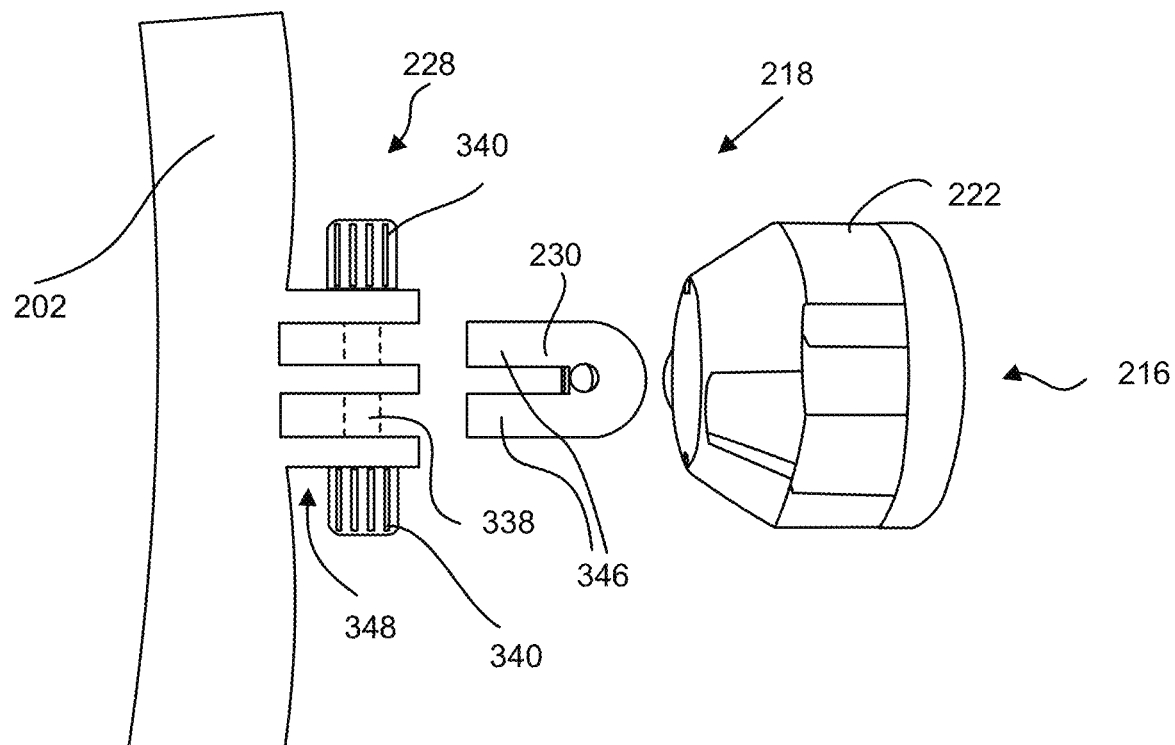
FIG. 3B is an exploded top perspective view illustrating details of the adjustable mount for the embodiment of the adjustable mount illustrated in FIG. 3A.

Referring now to FIGS. 3A, 3B, FIG. 3A is an exploded right-perspective view illustrating details of an adjustable mount 218 for the spectrally-tunable lighting module 216 of the embodiment of FIG. 2A. FIG. 3B is an exploded top perspective view illustrating details of the adjustable mount 218 for the embodiment of the adjustable mount illustrated in FIG. 3A.

As described above, one of the problems with existing loupes such as existing loupe 100 may exhibit is a misalignment between the focal point of light emitted by the light 116 and the focal point of the magnifiers 106. For example, because the weight of the existing loupe 100 may cause a dentist to reposition or otherwise adjust the existing loupes 100 as he or she wears it, the mount 118 may be jostled or bumped during the process. Often a mount, such as the mount 118, may be adjustable in a way that leaves it subject to misalignment if it is bumped or nudged inadvertently. This can create the problem of having to realign the direction of the light emitted from light 116 and the focal point of the magnifiers 106 to correct for such misalignment.

Moreover, the degrees of freedom and the direction of adjustment of a mount, such as the mount 118, may make it difficult to precisely align the direction of the light being emitted from light 116 and the focal point of a magnifiers 106. For example, if mount 118 is a type of ball joint, it may be adjusted in any direction, but such freedom of movement also makes it more challenging for a person making the adjustment to adjust the light to point in the correct vertical and horizontal angles.

The adjustable mount 218 may help solve problems associated with the mount 118 of existing loupes 100 by providing an adjustable mount 218 that allows the light emitted by the spectrally-tunable lighting module 216 to be "sighted in" to a correctly aligned elevation angle (e.g., up or down) and then separately "sighted in" to a correctly aligned azimuthal angle (e.g., side to side).

In at least one embodiment, the adjustable mount 218 comprises a plurality of vertically-oriented interlacing plates for adjusting and fixing an elevation angle of the spectrally-tunable lighting module with respect to the frame 202 and a plurality of horizontally-oriented interlacing plates for adjusting and fixing an azimuthal angle of the spectrally-tunable lighting module with respect to the frame 202.

Because the adjustable mount 218 comprises several sets of interlacing plates (e.g., 342, 344, 346, 348) the interlacing of the plates increases the number and area of coupling surfaces of the housing hinge 232 that robustly maintain the spectrally-tunable lighting module 216 in a predetermined alignment relative to the frame and to the focal point of the magnifiers 206. For example, by compressing the multiple surfaces of the interlacing plates 342 of the housing hinge 232 together against the interlacing plates 344 of the coupler 230 a greater degree of stability against movement is provided with less tightening pressure being applied by the tightener 334 or tighteners at each end of the shaft 336.

The shaft 336 may be any suitable fastener that can be configured to pass through holes in the horizontally-oriented interlaced plates of the housing hinge 232 and the coupler 230. For example, in one embodiment, the tightener 334 below the housing hinge 232 may be a knurled head of a shoulder bolt and the tightener 334 above the housing hinge 232 may be a knurled thumb nut so that the dentist or another loupe wearer may easily tighten the housing module at a preferred azimuthal angle (e.g., so that it is maintained in position without moving from side to side).

In at least one embodiment, the coupler 230 also includes two interlacing plates 346 that are vertically oriented which interlace with three interlacing plates 348 of the frame hinge 228 which are also vertically oriented which extend forward from a front portion of frame 202. In at least one embodiment, a shaft 338 passes horizontally through the interlacing plates 348 of the frame hinge 228 that are interlaced with the interlacing plates 346 of the coupler 330.

In some embodiments, the tighteners 334, 340 may be knurled or otherwise configured to be easily tightened by hand. In some embodiments, tighteners may further include a type of head or nut that may be tightened by use of a screwdriver, a hex key, a star-shaped driver, or any tightening tool known in the art. By providing tighteners (e.g., 342, 344, 346, 348) that can be tightened first by hand and then further tightened with the use of a tool, the spectrally-tunable lighting module 216 may be more securely maintained in alignment.

It may be recognized by one of the art that other plate configurations involving different numbers of interlacing plates for each of the components that make up the adjustable mount 218 may be useful in accordance with the embodiments described and claimed herein. Thus, as described above, the interlacing plates, e.g., 342, 344, 346, 348 of the adjustable mount 218 contribute to the hands-free nature because any adjustment can be made and secured prior to the procedure. This provides a way to eliminate contact between the dentist's hands in the loupe during the procedure. Other ways that the spectrally-tunable loupe is made hands-free are explained in more detail in the sections that follow.

Figure 4:
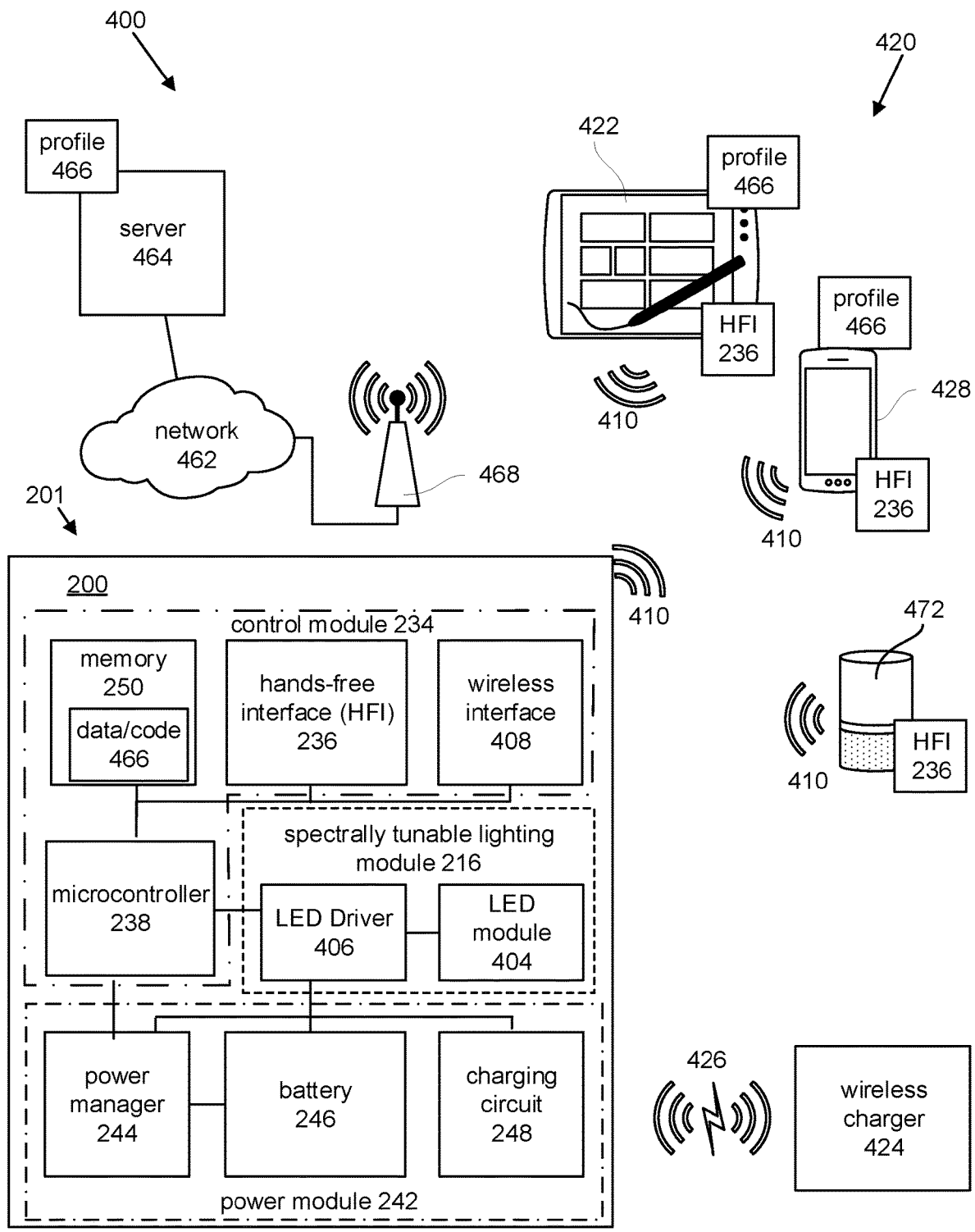
FIG. 4 is schematic block diagram illustrating one embodiment of a system that uses a hands-free spectrally-tunable smart loupe.

FIG. 4 is schematic block diagram illustrating one embodiment of a system 400 for illuminating an area during a procedure (e.g., a dental procedure). In at least one embodiment, the system 400 includes a head-mounted device 201 for illuminating an area based on one or more predetermined lighting commands. The system 400 further includes a hands-free interface 236 that communicates the one or more predetermined lighting commands for one or more procedures to be performed to the head-mounted device 201 for illuminating the area.

In the at least one embodiment, the system 400 also includes an LED module 404 that adjusts one or more spectral characteristics of light emitted by the head-mounted device 201 in response to the spectrally tunable lighting module 216 receiving the one or more predetermined lighting commands.

In at least one embodiment, the head-mounted device 201 for illuminating an area (e.g., an area within a patient's mouth) may be a loupe, a headlamp, a visor, that adjusts one or more spectral characteristics of light emitted by the apparatus 200 based on one or more predetermined lighting commands. For example, a first lighting command may be to shine a white light on the area during a first part of a procedure that requires high-intensity light or significant color matching (also referred to as shade matching). A second lighting command may be to shine a light that minimizes premature curing of a composite resin during a second part of the procedure.

The head-mounted device 201 may include any of the structures described above with respect to FIGS. 2 and 3 may further include additional structures described in this section with respect to FIG. 4. For example, as described above, in at least one embodiment, the hands-free spectrally-tunable smart loupe 200 includes a control module 234, a spectrally-tunable lighting module 216, and a power module 242.

In some embodiments, the hands-free interface 236 may form part of, or be disposed within the head-mounted device 201. In other embodiments, the hands-free interface 236 may be included with an external device 420. For example, an external device 420 such as a computing device 422, a smartphone 428, and a digital voice assistant 472 may include a hands-free interface 236 in place of or in addition to the hands-free interface 236 of the head-mounted device 201.

Additionally, in some embodiments, the head-mounted device 201 may have one of the various forms of being positioned on a wearer's head. For example, in some embodiments, instead of a frame 202 that is like an eyeglass frame, the head-mounted device 201 may comprise a visor, a hat, or a headlamp maintained in position by one or more straps.

In at least one embodiment, the control module 234 may include a microcontroller 238 which may include internal memory for storing and using data and program code. In some embodiments, the data and program code may be accessed by the microcontroller 238 from an external memory 250.

In at least one embodiment, the control module 234 may include a hands-free interface 236 that enables a wearer to communicate with and control the hands-free spectrally-tunable smart loupe 200 without necessitating any contact of the dentist's hands. In at least one embodiment, the hands-free interface 236 comprises one or more transducers disposed within the frame 202, where the one or more transducers are selected from the group consisting of optical sensors, proximity sensors, motion sensors, accelerometers, sound transducers, and haptic transducers.

For example, referring to also to FIG. 2A, the hands-free interface 236 may connect to a sensor 240 that senses a distance between the frame 202 and a patient. For example, in some embodiments, a lighting command is communicated through the sensor 240 to the control module 234 which then communicates to turn off the spectrally-tunable lighting module 216 if the sensed distance between the dentist or doctor and a patient exceeds a predetermined distance threshold for more than a predetermined period of time. This distance-based timeout function saves power and avoids unnecessary shining of light if for example, the dentist is looking away from the patient at a display screen or if the dentist has reached a point in the procedure where he or she doesn't need the spectrally-tunable lighting module to remain on. In some embodiments, the sensor 240 may include an infrared light emitter and an infrared light detector to measure a reflected distance.

In some embodiments, the hands-free interface 236 may include a sensor 240 such as the infrared type sensor described above. Although the sensor 240 is depicted as sensing phenomena that occur in the front of the frame 202, the sensor 240 may, or even another sensor 240 may be disposed to sense phenomena occurring at the side of the temple 208 or in any direction. In other embodiments, the hands-free interface 236 may include a motion detecting sensor that that senses gestures by sensing changes caused by the gestures in reflected infrared emissions, or in capacitance, or in inductance.

For example, the hands-free interface 236 make sense motion of a dentist's arm or wrist gesture such as a wave or a simulated flipping of a virtual anti-curing filter all without requiring any contact between the dentist's hands and the hands-free spectrally-tunable smart loupe 200. For example, a dentist could perform a first gesture that simulates flipping an anti-curing filter up for a part of a procedure that utilizes white light and further perform a second gesture that simulates flipping an anti-curing filter down for a part of the procedure that traditional utilizes light that is filtered to prevent premature curing. It may be noted by one of ordinary skill in the art that the sensor 240 or sensors may operate effectively to detect a predetermined direction of motion even though such motion may be performed with significant variation.

In some embodiments, the hands-free interface 236 may include a sound transducer such as a microphone that detects voice commands from the dentist. For example, in such embodiments, a dentist may vocally give a first lighting command by saying a word such as "white" in order to perform a part of a procedure that requires white light. The dentist may further vocally give a second command by saying the word such as "orange" in order to perform a part of a procedure that historically has required an orange or amber colored anti-curing filter. Moreover, because the control module 234, like any of the modules described herein, may be a distributed module, in some embodiments, the control module 234 may include one or more hands-free interfaces 236 that are located outside the frame 202.

In some embodiments, in response to receiving one or more lighting commands, in addition to controlling the light output of the spectrally-tunable lighting module 216, the control module 234 provides non-optical feedback to a wearer, meaning aware of the hands-free spectrally-tunable smart loupe 200. For example, a dentist may give a lighting command to emit light that minimizes premature curing of composite resins. In response, the control module 234 may provide non-optical feedback to the dentist such as for example, a tone, a voice message, or a vibration via a haptic transducer.

In some embodiments, the hands-free interface 236 or interfaces may be located within an external device 420, smartphone 428, and/or digital voice assistant 472. These devices may already include hardware and software that are optimized to detect, process, and communicate commands based on voice input. Thus, in such embodiments, one or more lighting commands may be communicated in a hands-free mode by a dentist saying a lighting command into an external device 420 such as for example, a computing device 422 (which may be a tablet, a laptop, a computer, a dental instrument, a medical instrument), a smartphone 428, or a digital voice assistant 472.

In some embodiments, the control module 234 includes a wireless interface 408 that is configured to receive commands from an external device 420 that is chosen from the group consisting of a computing device 422 (e.g., tablet, laptop computer, notebook computer, dental instrument, medical instrument,), a smartphone 428, and a digital voice assistant 472.

In some embodiments, lighting commands communicated via the hands-free interfaces 236 of the external device 420 may be communicated to the control module 234 of the hands-free spectrally-tunable smart loupe 200 via one or more wireless connections 410.

In some embodiments, the wireless connection 410 may be via a mobile telephone network. The wireless connection 410 may also employ a Wi-Fi network based on any one of the Institute of Electrical and Electronics Engineers (IEEE) 802.11 standards. Alternatively, the wireless connection 410 may be a BLUETOOTH® connection. In addition, the wireless connection 410 may employ a Radio Frequency Identification (RFID) communication including RFID standards established by the International Organization for Standardization (ISO), the International Electrotechnical Commission (IEC), the American Society for Testing and Materials® (ASTM®), the DASH7™ Alliance, and EPC-Global™.

Alternatively, the wireless connection 410 may employ a ZigBee® connection based on the IEEE 802 standard. In one embodiment, the wireless connection 410 may employ a Z-Wave® connection as designed by Sigma Designs®. Alternatively, the wireless connection 410 may employ an ANT® and/or ANT+® connection as defined by Dynastream® Innovations Inc. of Cochrane, Canada.

The wireless connection 410 may be an infrared connection including connections conforming at least to the Infrared Physical Layer Specification (IrPHY) as defined by the Infrared Data Association® (IrDA®). Alternatively, the wireless connection 410 may be a cellular telephone network communication. All standards and/or connection types include the latest version and revision of the standard and/or connection type as of the filing date of this application.

It may be recognized by one of ordinary skill of the art that hardware and software for many existing wireless connection types, such as for example, Bluetooth®, may be readily obtained both within an external device 420 such as for example, a computing device 422, a smartphone 428, and/or a digital voice assistant 472.

In some embodiments, the hardware and software within the external device 420 form part of a distributed control module 234 that also includes some components that may be at least partially enclosed within the frame 202. In some embodiments, the external components of control module 234 may be connected to parts of the control module 234 inside the frame 202 via the wireless connections 410.

Moreover, in some embodiments, the wireless interface 408 and wireless connections 410 allow the hands-free spectrally-tunable smart loupe to obtain parameters for the general profile 466 or general profiles from sources external to the frame 202. For example, in some embodiments, the one or more lighting commands may be customized based on data from a lighting profile communicated from a source on a network such as for example, a user account or user profile. Other network sources may include, for example, an LED manufacturer's site, a composite resin vendor site, a dental practice group site, and so forth.

In some embodiments, one or more lighting commands given by the care provider are customized based on a data from one or more first lighting profiles e.g., 518 and one or more second lighting profiles 520 associated with the general profile 466 for a particular loupe and/or a particular user which in some embodiments, may be communicated to the hands-free spectrally-tunable smart loupe over a network 462 and/or via wireless connections 410.

For example, the control module 234 may communicate via wireless interface 408 over wireless connections 410 to an access point 468 that communicates over network 462 to a server 464 to retrieve a general profile 466 that includes lighting related data for a for a particular type of type and shade of crown resin from a manufacturer's web site.

The ability to dynamically update a lighting profile e.g., 518, 520 within a general profile 466 via wireless connections 410 to information sources outside the hands-free spectrally-tunable smart loupe 200 significantly enhances the dental lighting technology by enabling access to a significantly expanded number of predetermined parameters that optimize the dentist's ability to perform various parts of procedures requiring different lighting commands. Additional details regarding the types of information that may be included in first lighting profile in the second lighting profile within a general profile 466 are described with additional details below.

Referring now to FIGS. 4, 5A, 5B, 5C, and 5D, FIG. 5A is a schematic block diagram illustrating an example first application for the embodiment of the hands-free spectrally-tunable smart loupe 200 of FIG. 2A that includes color matching as part of a procedure. FIG. 5B is a table illustrating a first lighting profile 518 for the first application 500 illustrated in FIG. 5A.

In some embodiments, a care provider gives one or more lighting commands that include switching between a first profile, e.g., the first lighting profile 518 and a second lighting profile 520 based on a particular application or procedure. For example, in at least one embodiment, the first lighting profile 518 may be optimized for color matching and the second lighting profile 520 may be optimized for minimizing premature curing of composites from light emitted by the spectrally-tunable lighting module 216.

In some embodiments, the first lighting profile 518 may provide emitted light with a color temperature in a range selected from 4500K-5500K and 5000K-6500K, and the second lighting profile 520 may provide emitted light with a color temperature in a range selected from 1200K-2000K, 1500K-3500K, and 2200K-3900K. A predetermined color temperature may be selected from within a given range in accordance with color matching shade matching and/or a likelihood of premature curing due to a given color temperature of light for a given composite resin.

Some applications utilize precise lighting for a particular purpose. For example, a first application 500 may be a color matching application for teeth (sometimes referred to as tooth shade matching). In the first application 500, a dentist may compare the appearance of a tooth 502 with a crown 504 which will be installed as part of the dental procedure. Suitable lighting under a variety of conditions is important for such applications.

For example, the shade of the crown 504 may appear to match the shade of the tooth 502 in bright lighting that simulates natural sunlight. However, the shade of the crown 504 may exhibit a slight mismatch under different lighting such as for example, lighting that simulates cool white indoor fluorescent lighting. Thus, for any first application 500 (or procedure), it may be beneficial to predetermine a first lighting profile 518 that is suitable for the first application 500.

In at least one embodiment, a general profile 466 may include a first lighting profile 518 that include various types of lighting related data. For example, the first lighting profile 518 may include entity data 506 that provides information about a particular user such as the user's name or the name of the practice. The entity data 506 may also information indicating that the values or the profile are associated with a particular manufacturer of dental materials or materials for other types of procedures. This type of entity data may help standardize lighting conditions for a particular practice group when performing a particular procedure.

In some environments, the first lighting profile 518 may include application data 508 that identifies lighting parameters or other information related to a particular application. For example, the first lighting profile 518 may include application data 508 that specifies that the color temperature for a particular color matching application should be set to a particular value in the range of 5000 to 6500K.

The application data 508 may further indicate that the color rendering index of the lighting for the particular application should be 90 or higher. Many types of application data could be included in the first lighting profile, or the lighting profile could be very simple with only a few parameters that change in response to one or more lighting commands.

FIG. 5C is a schematic block diagram illustrating a second application 530 for the embodiment of FIG. 2A where curing of a composite resin 590 is intended to be performed by application of a curing light 588. However, premature curing of the composite resin 590 as a result of light emitted by the spectrally-tunable lighting module 216 is intended to be minimized. Unlike an amalgam filling which has a metallic appearance, a composite resin 590 may be used so as to more closely match the color of a tooth 522 to be filled.

Some composite resins 590 used in dental work are cured or hardened by application of light in the blue range of visible light or by other short wavelength light. If the spectrally-tunable lighting module 216 of the hands-free spectrally-tunable smart loupe 200 emits blue light having a similar wavelength to that of the curing light, some portions of the composite resin 590 may experience some degree of premature curing which may weaken or otherwise impair the quality of the filling. Therefore, in some embodiments, the first lighting profile 518 optimized for dental color matching and the second lighting profile 520 is optimized for minimizing premature curing of dental composites resulting from the light emitted by the spectrally-tunable lighting module.

FIG. 5D is a table illustrating one embodiment of a second lighting profile 520 for the second application 530 illustrated in FIG. 5C may include the same kinds of information of the first lighting profile 518 or may include some types of information not included in the first lighting profile 518.

One benefit of the hands-free spectrally-tunable smart loupe is that, in contrast to the anti-curing filter 124 of the existing loupe 100 which typically has an orange or amber filter that must be manually adjusted or flipped, the hands-free spectrally-tunable smart loupe 200 offers an infinite commendation of choices may be configured to provide suitable lighting for any procedure or group of procedures.

Some embodiment, the first lighting profile 518 and second lighting profile 520 include device data 510, 526 that may indicate for example, various types of devices being used in the hands-free spectrally-tunable smart loupe 200 and parameters that may be dynamically changed as a care provider switches from a first lighting profile 518 to second lighting profile 520. For example, in the impediments illustrated in FIGS. 5B and 5D, the type of LED module 404 used in the spectrally-tunable lighting module 216 includes a combination of multiple light-emitting diodes selected from red, green, blue, and white (RGBW) LEDs.

In one embodiment illustrated in FIG. 5B, in the first lighting profile 518, all of the red, green, blue, and white LED's are turned on to a high level, e.g., substantially fully turned on. Based on a lighting command given by a care provider and further based on application data 524 and/or device data 526 in the second lighting profile 520, the LED module 404 may emit light having a low color temperature, e.g., 3500K to avoid premature curing of the composite resin 590.

In some embodiments, a similar lighting output may be emitted by the spectrally-tunable lighting module 216 using a different type of LED module that may include cool white LEDs 'C' and warm white LEDs 'W.' In this example in the first lighting profile 518 the cool white LED is turned on full and the warm white LED is turned on low and when hands-free command is given to switch to the second lighting profile 520 the cool white LED module is turned on to a low level or turned completely off in the warm white LED module is turned to a high level.

In some embodiments, the device data 510, 526 may include information about the type of LED driver used to drive the LED inputs. Example some LED drivers use a constant current to drive LEDs while other LED drivers use constant voltage. In some embodiments, technical details of device data 510, 526 need not be provided by or understood by the care provider using the loupe but the general profile 466 and/or the first lighting profile 518 and the second lighting profile 520 may include device data 510, 566 that is accessed by the microcontroller 238.

Although various types of LED modules have been developed for some types of lighting applications, there are certain unique lighting requirements for certain applications such as dentistry. Without the limitations of only two choices (filter or no filter) presented by the existing anti-curing filter 124, significant improvement may be achieved hands-free spectrally-tunable smart loupe 200 over the existing loupe 100. For example, in some applications such as the second application 530 illustrated in FIG. 5C, it may be desirable to have lighting that improves the ability to determine color or shade matching of the composite resin 590 to the tooth 522.

Figures 6A, 6B, 6C:
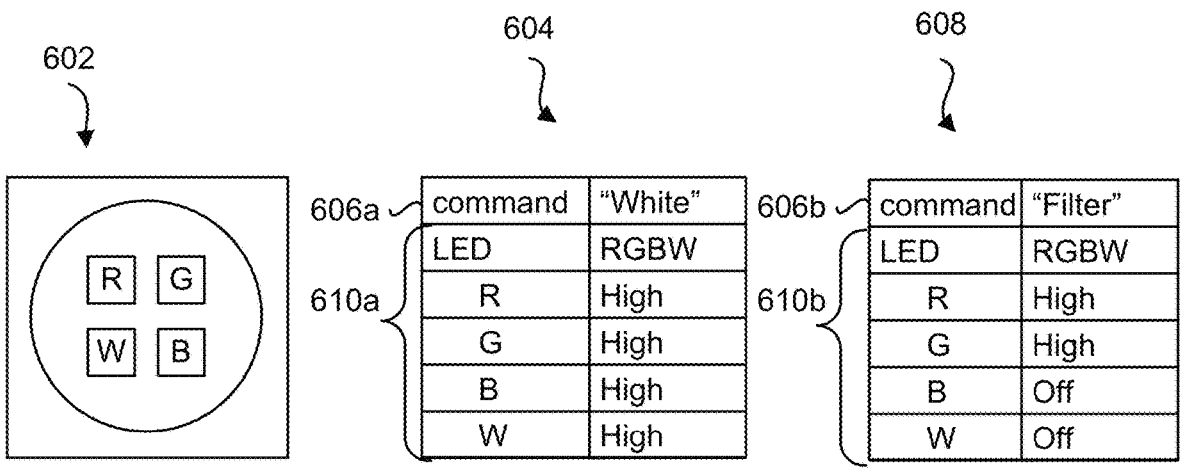
FIG. 6A is a schematic block diagram of one embodiment of a light-emitting diode (LED) module that may be used in a hands-free spectrally-tunable smart loupe.
FIG. 6B is a table illustrating one embodiment of a first lighting profile that may be used in connection with the LED module of FIG. 6A.
FIG. 6C is a table illustrating one embodiment of a second lighting profile that may be used in connection with the LED module of FIG. 6A.

Referring now to FIGS. 6A, 6B, 6C, and 6D with references to elements shown in FIGS. 2A, 2B, and 4. FIG. 6A is a schematic block diagram of one embodiment of an LED module 602 that may be used in a hands-free spectrally-tunable smart loupe. In at least one embodiment, the LED module 602 comprises a red LED 'R,' a green LED 'G,' a blue LED 'B,' and a white LED 'W.' Various combinations of the R, 'G,' 'B,' and W elements may be turned on or off with varying levels of intensity in order to provide light suitable for a particular application. In some embodiments, using the LED module 602 with one LED per color provides cost benefits as well as simplified driver and control design. It may be noted that with respect to FIG. 6A the white LED 'W' may be a cool white LED, or a neutral white LED, or a warm white LED depending on the particular intended application. In some embodiments, a neutral white LED having a color temperature of about 5000K may be suitable.

One example of an LED module 602 having RGBW LEDs is the XLamp® XM-L color LED module available from Cree at 4600 Silicon Drive, Durham, N.C., 27703 USA. In some embodiments, such an LED module 602 may be effective in providing suitable lighting for applications such as general dental color matching in accordance with a first lighting profile 604 as shown in FIG. 6B.

FIG. 6B is a table illustrating one embodiment of a first lighting profile 604 that may be used in connection with the LED module 602 of FIG. 6A. For purposes of simplification, only certain values of device data 610a are shown in the first lighting profile 604. A first lighting command 606a may be the word "white." In some embodiments, the first lighting command 606a may be a voice command received through the hands-free interface 236 shown in FIGS. 2A, 2B, and 4 or through the wireless interface 408 shown in FIG. 4, including via the hands-free interface 236 on associated with the external device 420 which may be for example, tablet 422, smartphone 428, and digital voice assistant 472.

In some embodiments, in response to the first lighting command 606a the control module 234 communicates to the spectrally-tunable lighting module 216 such that the LED driver 406 drives each of the red LED 'R', the green LED 'G', the blue LED 'B', and the white LED 'W' to a high level of intensity in order to illuminate an area for a procedure to be performed with lighting suitable for color matching and/or general examination and procedures.

FIG. 6C is a table illustrating one embodiment of a second lighting profile 608 that may be used in connection with the LED module of FIG. 6A. When a care provider communicates a second lighting command 606b (e.g., the word "filter") which may be communicated verbally or electronically through the hands-free interface 236 or the wireless interface 408 as described above, the control module 234 may respond by communicating to the spectrally-tunable lighting module 216 such that the LED driver 406 drives the red LED 'R' and the green LED 'G' each to a high level of intensity. It may be noted by one of ordinary skill that what constitutes a high level, mid-level, or low-level may depend upon the particular application including color rendering index and anti-curing characteristics desired.

Figure 6D:
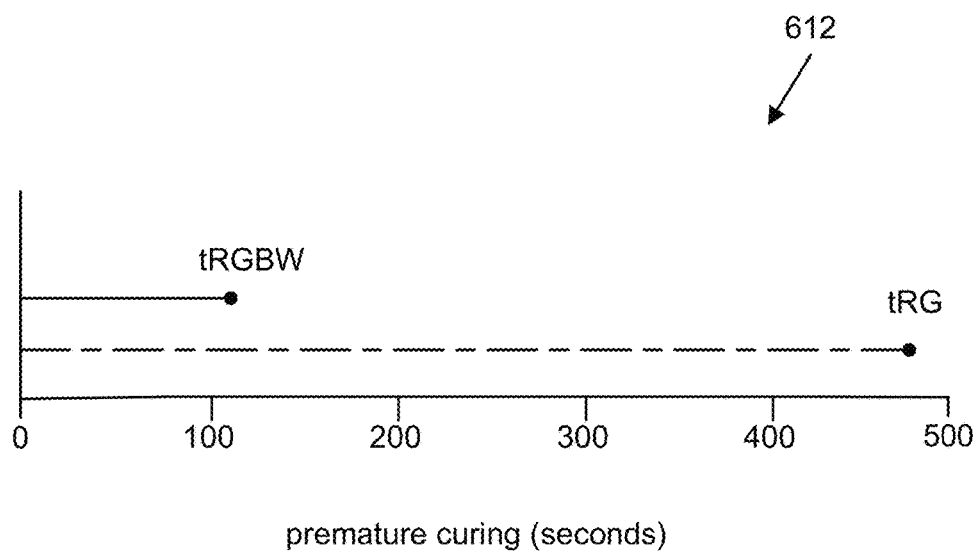
FIG. 6D is a chart illustrating the relative impact of the first lighting profile of FIG. 6B and the second lighting profile of FIG. 6C premature curing of a light-cured resin composite.

FIG. 6D is a chart 612 illustrating the relative impact of the first lighting profile of FIG. 6B and the second lighting profile of FIG. 6C premature curing of a light-cured resin composite. In one experiment, from which the chart 612 is derived, a layer of dental composite material, such as composite resin 590 as shown in FIG. 5C, was smeared on a glass slide.

Inside a dark room, the LED module 602, an RGBW-type LED module, was mounted 14 inches above the glass slide. All four LEDs ('R,' 'G,' 'B,' 'W') were turned on to a high level to provide white light. A first time tRGBW to complete curing (i.e., solidification) of the composite resin 590 after exposure to the white light of the first lighting profile 604 was observed to be 110 seconds.

A second slide with a similar amount of composite resin 590 was provided under the same conditions and communication of a second lighting command e.g., 606b "filter" was simulated by turning off the blue 'B' and the white 'W' LEDs to provide an amber or orange appearing light from the mixing of the red and green light emitted by the red LED 'R' and the blue LED 'B', with a similar color to that of an anti-curing filter such as the anti-curing filter 124 shown in FIG. 1. A second time tRG to complete curing (i.e., solidification) of the composite resin 590 was observed to be 480 seconds.

The results show that lighting commands to turn off the blue LED 'B' and the white LED 'W' as shown in the second lighting profile 608 significantly reduces the degree of premature curing resulting from a light emitted by LED module 602. One may note that under normal lighting conditions encountered in, for example, a dental procedure, ambient light or other light may modify the relative impact of the first lighting profile 604 and the second lighting profile 608.

In other embodiments, the hands-free spectrally-tunable smart loupe 200 may include other types of spectrally-tunable lighting modules 216 that include an LED module 404 that has an alternative combination of LEDs from those depicted here to emitted light with different tunable characteristics.

Figure 7A:
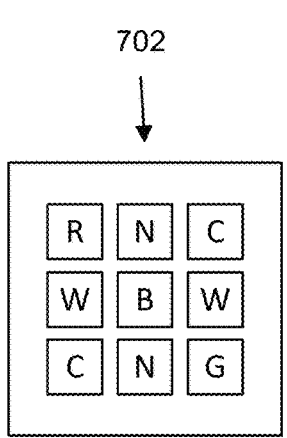
FIG. 7A is a schematic block diagram of another embodiment of an LED module that includes a checkerboard pattern of a white LEDs with different color temperatures and red, green, and blue LEDs.

FIG. 7A is a schematic block diagram of another embodiment of an LED module 702 that includes a checkerboard pattern of a white LEDs with different color temperatures and red, green, and blue LEDs. In some embodiments, multiple diodes may be arranged in an alternating color pattern. For example, the LED module 702 illustrates one alternating color pattern where a top center LED is a neutral white LED 'N,' a middle center LED is a blue LED 'B' and a bottom center LED is a neutral white LED 'N.' Thus, the center column of LED module 702 depicts a pattern that alternates between a white colored LED 'N' and a single colored LED (e.g., blue LED 'B').

In some embodiments, the alternating pattern of LEDs enables effective distribution of emitted light having a predetermined range of color temperatures. In some embodiments, a first lighting profile similar to first lighting profile 518 described in FIG. 5B provides emitted light with a color rendering index of greater than 90. In general, light emitted by a mixture of light from single color LEDs e.g., 'R', 'B', G has a much lower coloring rendering index than light emitted from 'C', 'N', and 'W' LEDs which have been manufactured or screened to meet a predetermined minimum CRI of 90.

Figure 7B:
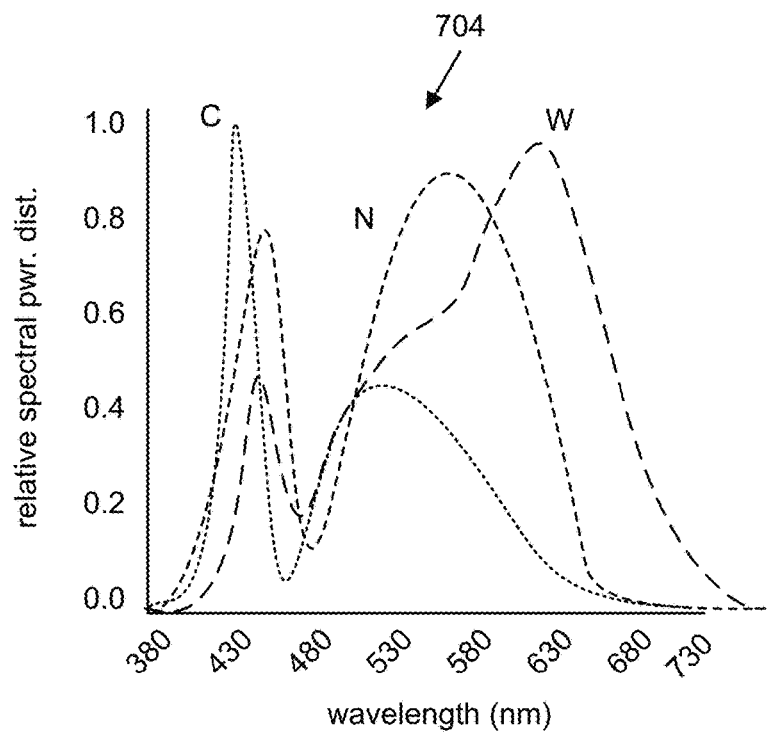
FIG. 7B is a graph comparing the relative spectral power distribution by light wavelength for the white LEDs with different color temperatures of the LED module illustrated in FIG. 7A.

FIG. 7B is a graph 704 comparing the relative spectral power distribution by light wavelength for the white LEDs with different color temperatures of the LED module illustrated in FIG. 7A. In some embodiments, light emitted from the first lighting profile, e.g., 518 is selected by a turning on combinations of 'C,' 'N,' and 'W' white LEDs with predetermined intensities.

Figure 7C:
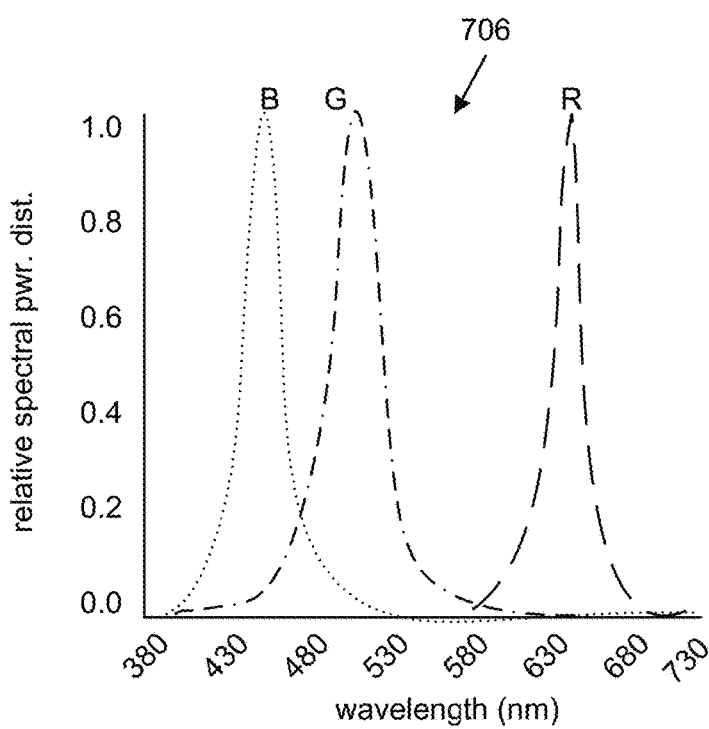
FIG. 7C is a graph comparing the relative spectral power distribution by light wavelength for the red, green, and blue LEDs of the LED module illustrated in FIG. 7A.

FIG. 7C is a graph comparing the relative spectral power distribution by light wavelength for the red, green, and blue LEDs of the LED module illustrated in FIG. 7A. In some embodiments, the output of any individual LED or any combination of LEDs may be determined by driving a group of specific individual LEDs to have a light output from 0.0 to 1.0 in accordance with a predetermined lighting profile.

For example, if the first lighting profile, e.g., 518 is optimized for shade matching of a crown to a patient's tooth, 'R', G, and 'B' LEDs shown in FIG. 7C may be turned completely off in the first lighting profile 518 because the light emitted by mixing the 'R', 'G', and 'B' LEDs may fall below a predetermined threshold for CRI.

In some embodiments, the second lighting profile 520 is additionally optimized for color matching of dental composites to teeth. For example, in some embodiments, the second lighting profile, e.g., 520 may be optimized to improve shade matching between a composite resin 590 and a tooth 522 while at the same time minimizing premature curing. As can be seen by the dashed line labeled 'W' in the graph of light output 704 as shown in FIG. 7B, the output intensity of blue light emitted (e.g., in the range of 400-480 nm) by the warm white LEDs 'W' may be sufficiently low to avoid premature curing that exceeds unacceptable threshold. At the same time, light emitted from the warm white LEDs may exceed a CRI of 90 thus enabling improved color matching over white light emitted by the light 116 that is filtered by an anti-curing filter (e.g., 124).

It may be noted that in some embodiments, the individual LEDs making up the alternating pattern need not be limited to 'R,' 'G,' 'B,' 'C,' 'N,' and 'W.' For example, in some embodiments, infrared LEDs 'I,' ultraviolet LEDs 'U' may be used instead of or in combination with the aforementioned LED types. Such patterns may be useful for hands-free spectrally-tunable smart loupes where a first lighting profile is configured to emit light having a typical daylight, ambient, or other broad-spectrum white light characteristics and a second lighting profile is configured to emit narrow-spectrum light suitable for a specific application.

Figure 7D:
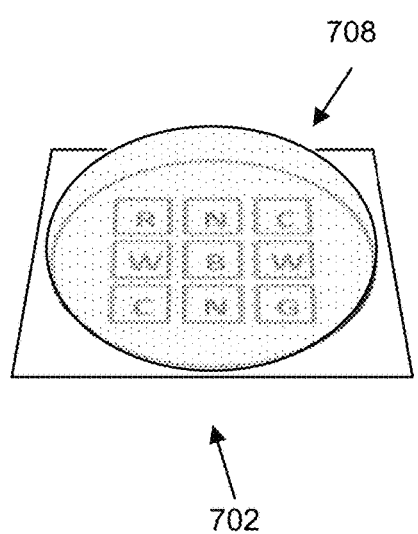
FIG. 7D is a schematic block diagram illustrating a perspective view of the LED module of FIG. 7A with a diffuser lens.

For example, in some embodiments, ultraviolet-emitting LEDs 'U' may be used in forensic applications to detect biological fluids such as urine, semen, and so forth. In other embodiments, near-infrared emitting LEDs "I" may be used in connection with procedures involving skin and/or eyes. In such embodiments, the hands-free spectral tuning of the hands-free spectrally-tunable smart loupe may enable the practitioner to more accurately and efficiently perform the procedure under suitable first and second lighting profiles lighting profile FIG. 7D is a schematic block diagram illustrating a perspective view of the LED module 702 of FIG. 7A with a diffuser 708. In some embodiments, the diffuser 708 may be disposed between the one or more light emitting diodes of the LED module 702 and the area to be illuminated. For example, in some embodiments, the diffuser 708 may encapsulate the one or more LEDs included in the LED module 702. In other embodiments, the diffuser 708 may be may be disposed at a distance from the one or more LEDs of the LED module 702.

In some embodiments, the diffuser 708 may minimize spectral gradients within the illuminated area (e.g., from tooth to tooth in a patient's mouth). In certain LED modules, spatial separation between LEDs comprising an alternating color pattern within an LED module may produce spectral inhomogeneities in an area illuminated for performing a procedure. In some embodiments, the inclusion of a diffuser 708 may minimize spectral inhomogeneities within the illuminated area while allowing for fewer or more varied color patterns of LEDs to be included in the LED module 702.

Figure 8A:
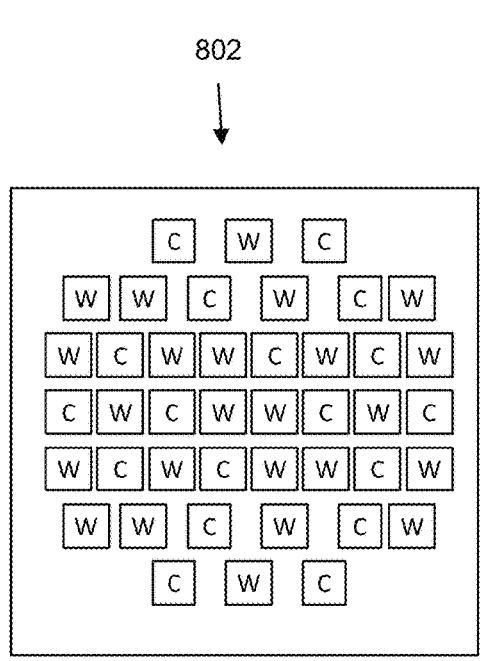
FIG. 8A is a schematic block diagram of one embodiment of an LED module that includes checkerboard pattern of cool-white LEDs and warm-white LEDs.

FIG. 8A is a schematic block diagram of one embodiment of an LED module 802 that includes a checkerboard, e.g., an alternating pattern of cool-white LEDs 'C' and warm-white LEDs 'W.' In some embodiments, 802 may include a significant number of warm white LEDs "W" that exceeds the number of cool white LEDs 'C' by a predetermined amount. For example, the LED module 802 illustrated in FIG. 8A includes 24 warm white LEDs 'W' and 18 cool white LEDs 'C'.

In some embodiments, the spectrally-tunable lighting module 216 may include an LED module like LED module 802 that consists only of cool white LEDs 'C' and warm white LEDs 'W.' One source for an LED module that includes an alternating pattern of warm white LEDs and cool white LEDs is the Vesta" series tunable 9 mm Array available from BridgeLux of 46430 Fremont Blvd., Fremont, Calif. 94538.

In some embodiments, a benefit of having a significant number of warm white LEDs, and neutral white LEDs is that the first lighting profile, e.g., 518 and the second lighting profile, e.g., 520 may be high flux profiles emitting a typical flux of 1000 lumens or more. In such embodiments, the housing, e.g., 222 may be designed to channel heat away from a wearer's head, and the power manager 244 may control the power provided to the LED driver 406 to limit maximum power output to predetermined periods of time.

In some embodiments, each of the LEDs in LED module 802 has a CRI of greater than 90. However, the first lighting profile, e.g., 518 may be optimized for shade matching and the second lighting profile 520 may be optimized to minimize premature curing. Neither profile need be limited to profiles where all LEDs of a particular color temperature are turned on or where all LEDs of particular color temperature are turned off. Instead, the first lighting profile 518 may turn on a predetermined pattern of more cool white LEDs 'C' turned on and fewer warm white LEDs 'W' turned on.

Similarly, the second lighting profile 520 may turn on a predetermined pattern of more warm white LEDs 'W' turned on and fewer cool white LEDs 'C' turned on. Additionally, the intensity of one or more LEDs of a particular color or type may vary in accordance with an application defined in a first lighting profile and a second lighting profile.

Figure 8B:
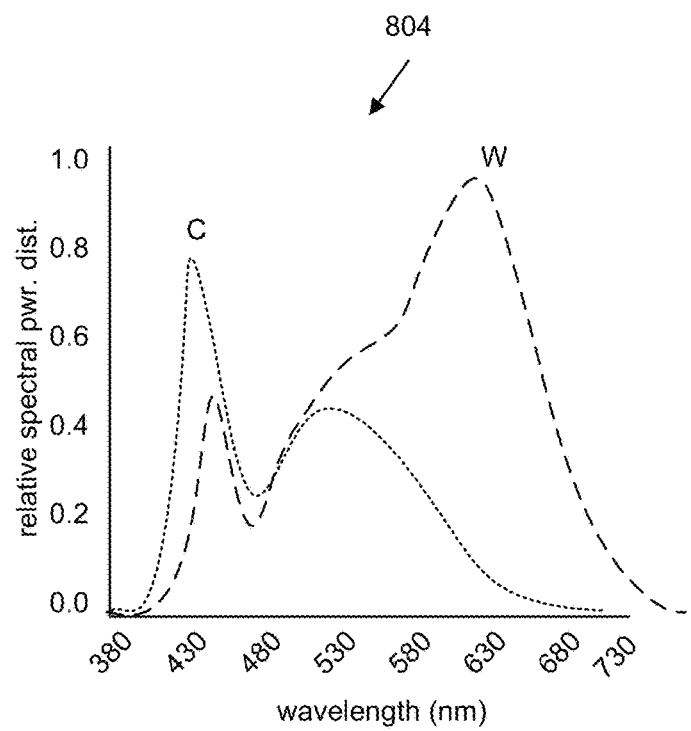
FIG. 8B is a graph comparing the relative spectral power distribution by light wavelength for the LED module of FIG. 8A.

FIG. 8B is a graph comparing the relative spectral power distribution by light wavelength for the LED module of FIG.

8A. In some embodiments, the peak output of the warm white LEDs 'W' may exceed peak output of the cool white LEDs 'C.'

Figure 8C:
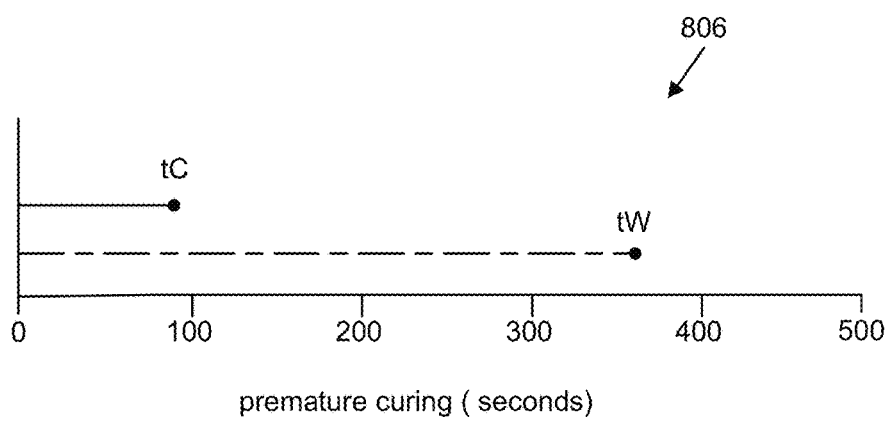
FIG. 8C is a chart illustrating the relative impact of the cool white LEDs and the warm white LEDs on premature curing of a light-cured resin composite.

FIG. 8C is a chart 806 illustrating the relative impact of a cool white LEDs 'C' like those shown in FIG. 8*a* and a warm white LED 'W' like those shown in FIG. 8A on premature curing of a light-cured resin composite. An experiment was performed using a cool white LED having a color temperature of about 6000K and a warm white LED having a color temperature of about 2700K.

The procedure for determining values for the chart 806 of premature curing was substantially the same as described above with respect to FIG. 6D. With only cool white light 'C' being emitted as shown in dotted line 'C' of graph 804 in FIG. 8B, the time to curing tC was 90 seconds and with only warm white light being emitted as shown in dashed line 'W' of graph 804 the time to curing tW was 360 seconds.

Figure 9:
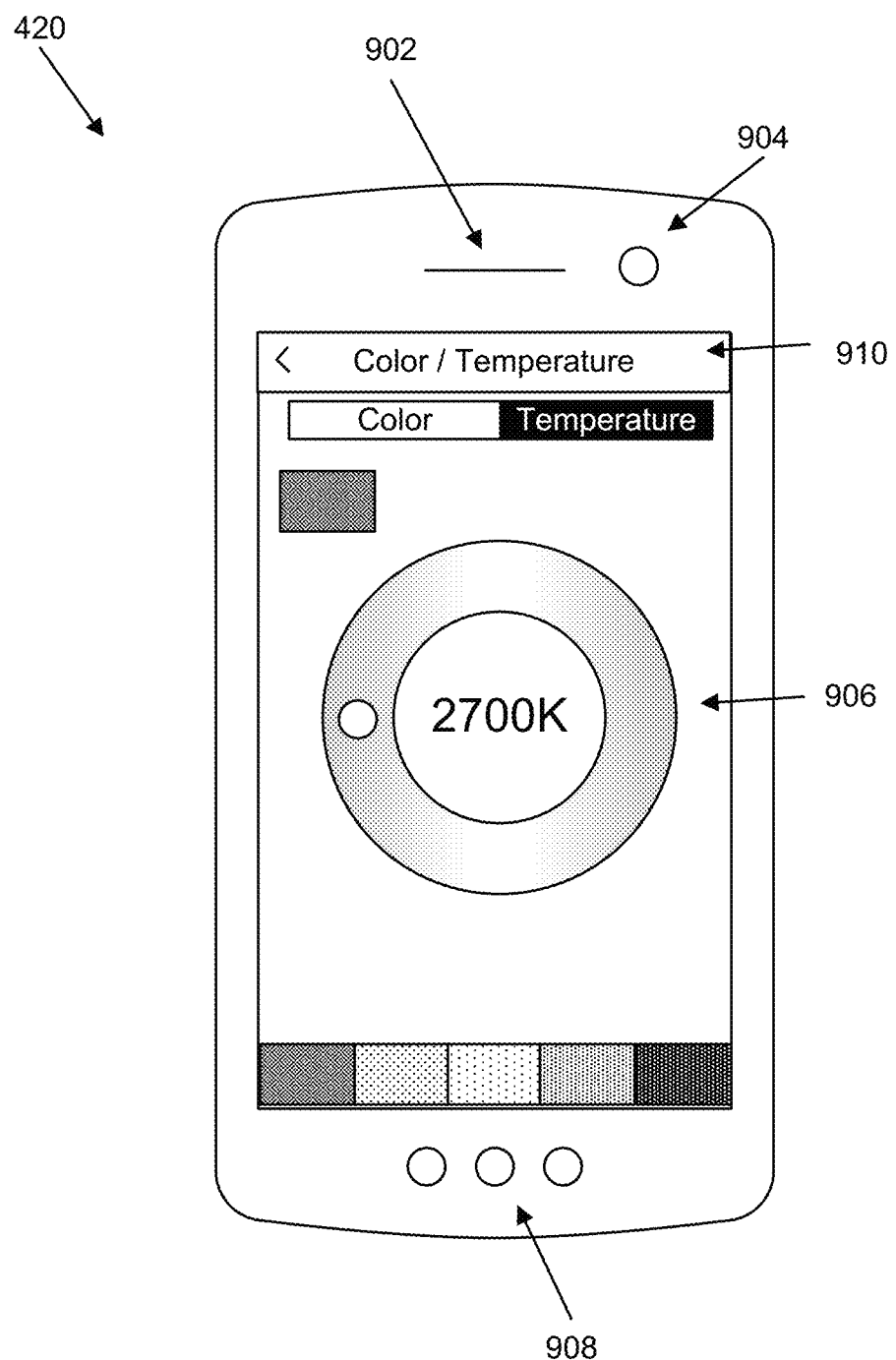
FIG. 9 is a schematic block diagram illustrating a device that includes hands-free interfaces and touch interfaces by which a user may communicate commands between the device and the hands-free spectrally-tunable smart loupe.

FIG. 9 is a schematic block diagram illustrating an external device 420 that includes a first hands-free interface 902 such as a speaker and a second hands-free interface 908 such as a microphone. The external device 420 may further include a touchscreen display 906 by which a user may communicate commands other than hands-free lighting commands between the external device 420 and the hands-free spectrally-tunable smart loupe 200. For example, a user may use the touchscreen display 906 to set and/or view a particular color temperature to be associated with a particular first lighting profile such as first lighting profile 518.

The touchscreen display 906 may also display a menu 910 or other controls. In some embodiments, the external device 420 includes a sensor 904 which may be, for example, a camera or a light sensor. In some embodiments, the sensor 904 may be used to detect gestures related to lighting commands. In other embodiments, the sensor 904 may be used as a calibration input for the spectrally-tunable lighting module 216.

For example, a user may position the spectrally-tunable lighting module 216 so that it emits light into the sensor 904. The sensor 904 may detect the emitted light and determine whether the color temperature, intensity, or other lighting characteristics match the expected characteristics for the current lighting commands or lighting profile communicated to the spectrally-tunable lighting module 216.

In some embodiments, the external device 420 may be a smartphone 428. In other embodiments, the external device 420 may be a computing device 422 such as a tablet, a laptop, a computer, a dental instrument, or a medical instrument. The external device 420 may include a touchscreen display 906 and one or more hands-free interfaces such as first hands-free interface 902 and second hands-free interface 908.

A user of the hands-free spectrally-tunable smart loupe 200 may use the touchscreen display 906 of the external device 420 prior to a procedure to set up a general profile 466 or to select from different options displayed on a menu 910

Figure 10:
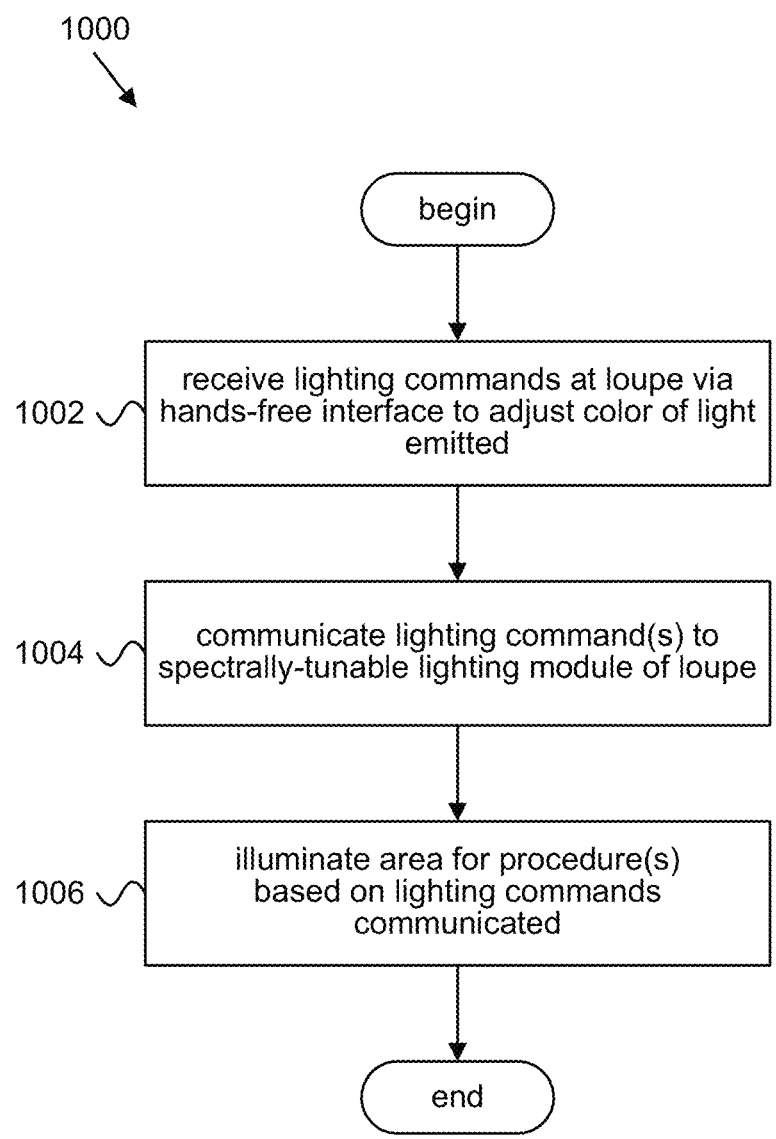
FIG. 10 is a flowchart diagram illustrating a method of using the hands-free spectrally-tunable smart loupe of FIG. 2A.

FIG. 10 is a flowchart diagram illustrating a method 1000 for illuminating an area for one or more procedures. In at least one embodiment, the method 1000 begins and includes receiving 1002 at a loupe one or more lighting commands via a hands-free interface to adjust one or more color characteristics of light emitted from a spectrally-tunable lighting module for the loupe.

In the at least one embodiment, the method 1000 continues and includes communicating 1004 the one or more lighting commands for the one or more procedures to the spectrally-tunable lighting module of the loupe. The method 1000 continues and further includes illuminating 1006 an area for performing the one or more procedures in response to the one or more lighting commands communicated to the spectrally-tunable lighting module of the loupe, and the method 1000 ends.

In some embodiments, the loupe of the method 1000 at which the one or more lighting commands is received may be, for example, the hands-free spectrally-tunable smart loupe 200 substantially as described above with respect to FIGS. 2A, 2B, 3A, 3B, 4, 5A-5D, and 6A-6D. In some embodiments of the method 1000, the one or more lighting commands may be lighting commands such as first lighting commands 606*a* and second lighting command 606*b* associated that are associated with one or more first and second lighting profiles e.g., 518, 520 that are each configured to provide suitable lighting for the one or more procedures.

In some embodiments, receiving 1002 the lighting commands may include receiving commands to adjust one or more color characteristics of light emitted from a spectrally-tunable lighting module for the loupe where the color characteristics are chosen from the group consisting of color temperature, color rendering index, and intensity.

In some embodiments, the hands-free spectrally-tunable smart loupe of the method may include a spectrally-tunable lighting module 216 that includes an LED module 404 which may include multiple LEDs configured as illustrated in LED modules 602, 702, 802, or as in other configurations in accordance with the apparatuses and systems described with respect to FIGS. 2A-9.

In some embodiments, illuminating 1006 an area for performing one or more procedures may refer to an area for performing one or more dental procedures, one or more surgical procedures, and/or one or more medical procedures. In other embodiments, illuminating 106 an area for performing one or more procedures may refer to an area for performing one or more art restoration procedures, jewelry procedures, counterfeit detection procedures, and the like.

This description uses examples to disclose the invention and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A hands-free spectrally-tunable loupe comprising:
   a frame;
   a spectrally-tunable lighting module comprising one or more light-emitting diodes;
   a control module with a hands-free interface that controls a light output of the spectrally-tunable lighting module in response to one or more lighting commands; and
   a power module within the frame that powers the control module and the spectrally-tunable lighting module.

2. The hands-free spectrally-tunable loupe of claim 1, further comprising an adjustable mount that couples the spectrally-tunable lighting module to an upper front portion of the frame.

3. The hands-free spectrally-tunable loupe of claim 2, wherein the adjustable mount comprises a plurality of vertically-oriented interlacing plates for adjusting and fixing an elevation angle of the spectrally-tunable lighting module with respect to the frame and a plurality of horizontally-oriented interlacing plates for adjusting and fixing an azimuthal angle of the spectrally-tunable lighting module with respect to the frame.

4. The hands-free spectrally-tunable loupe of claim 2, wherein the one or more light-emitting diodes are selected from the group consisting of red, green, blue, and white.

5. The hands-free spectrally-tunable loupe of claim 4, wherein the one or more light-emitting diodes comprise a plurality of diodes arranged in an alternating color pattern.

6. The hands-free spectrally-tunable loupe of claim 5, further comprising a diffuser disposed between the one or more light-emitting diodes and the illuminated area to minimize spectral inhomogeneities within the illuminated area.

7. The hands-free spectrally-tunable loupe of claim 2, wherein the control module selects the one or more lighting commands based on an input to the hands-free interface, the input chosen from the group consisting of voice commands and gestures.

8. The hands-free spectrally-tunable loupe of claim 7, wherein the hands-free interface comprises one or more transducers disposed within the frame, the one or more transducers selected from the group consisting of optical sensors, proximity sensors, accelerometers, sound transducers, and haptic transducers.

9. The hands-free spectrally-tunable loupe of claim 8, wherein the control module comprises a wireless interface configured to receive commands from an external device chosen from the group consisting of a computing device, a tablet, a smartphone, and a digital voice assistant.

10. The hands-free spectrally-tunable loupe of claim 9, wherein, in response to the one or more lighting commands, in addition to controlling the light output of the spectrally-tunable lighting module, the control module provides non-optical feedback to a wearer.

11. The hands-free spectrally-tunable loupe of claim 8, wherein the one or more lighting commands are customized based on a data from a lighting profile communicated from a source on a network.

12. The hands-free spectrally-tunable loupe of claim 2, wherein the power module comprises a battery disposed within a rear portion of the frame, wherein the rear portion of the frame comprises a planiform portion configured to resiliently press against a back portion of a wearer's head during use.

13. The hands-free spectrally-tunable loupe of claim 12, further comprising a charging circuit that receives power wirelessly for recharging the battery.

14. The hands-free spectrally-tunable loupe of claim 1, wherein the one or more lighting commands comprise switching between a first lighting profile and a second lighting profile.

15. The hands-free spectrally-tunable loupe of claim 14, wherein the first lighting profile is optimized for shade matching and the second lighting profile is optimized for minimizing premature curing of composites resulting from a light emitted by the spectrally-tunable lighting module.

16. The hands-free spectrally-tunable loupe of claim 15, wherein the second lighting profile is additionally optimized for shade matching of dental composites to teeth.

17. The hands-free spectrally-tunable loupe of claim 15, wherein the first lighting profile provides emitted light with a color rendering index of at least 90.

18. The hands-free spectrally-tunable loupe of claim 15, wherein the first lighting profile provides emitted light with a color temperature in a range selected from 4500K-5500K and 5000K-6500K, and wherein the second lighting profile provides emitted light with a color temperature in a range selected from 1200K-2000K, 1500K-3500K, and 2200K-3900K.

19. A system comprising:
a head-mounted device for illuminating an area based on one or more predetermined lighting commands;
a hands-free interface that communicates the one or more predetermined lighting commands for one or more procedures to be performed to the head-mounted device; and
a lighting module that adjusts one or more spectral characteristics of light emitted by the head-mounted device in response to receiving the one or more predetermined lighting commands.

20. A method comprising:
receiving one or more lighting commands at a loupe via a hands-free interface for adjusting one or more color characteristics of light emitted from a spectrally-tunable lighting module for the loupe;
communicating the one or more lighting commands for the one or more procedures to the spectrally-tunable lighting module of the loupe; and
illuminating an area for performing the one or more procedures in response to the one or more lighting commands communicated to the spectrally-tunable lighting module of the loupe.

* * * * *